United States Patent [19]

Weber

[11] Patent Number: 4,768,558
[45] Date of Patent: Sep. 6, 1988

[54] MULTI-PORT VALVE ASSEMBLY

[75] Inventor: Kent Weber, Rockford, Ill.

[73] Assignee: Sundstrand Corporation, Rockford, Ill.

[21] Appl. No.: 34,673

[22] Filed: Apr. 6, 1987

[51] Int. Cl.[4] .............................................. F16K 1/52
[52] U.S. Cl. .................................. 137/862; 251/205; 251/903
[58] Field of Search .................. 137/862, 870, 883; 251/122, 205, 903; 184/81

[56] References Cited

U.S. PATENT DOCUMENTS

| | | | |
|---|---|---|---|
| 1,202,895 | 10/1916 | Rogers | 137/870 |
| 3,330,543 | 7/1967 | Memaerson | 251/903 X |
| 3,382,890 | 5/1968 | Howland | 137/870 X |
| 4,211,258 | 7/1980 | Switall | 137/862 |
| 4,371,479 | 2/1983 | Nokamura et al. | 251/903 X |

FOREIGN PATENT DOCUMENTS 937076  9/1963  United Kingdom ................ 184/81

Primary Examiner—A. Michael Chambers
Assistant Examiner—John C. Fox
Attorney, Agent, or Firm—Wood, Dalton, Phillips, Mason & Rowe

[57] ABSTRACT

A multi-port valve assembly for controlling the flow of fluid through a plurality of outlet ports. A valve housing defines a common inlet and a plurality of outlet ports. A valve member corresponds to each outlet port for controlling fluid flow through the respective port. Each valve member is independently adjustable for separately adjusting fluid flow characteristics through its respective port. All of the valve members are conjointly movable for controlling fluid flow through all the outlet ports simultaneously.

24 Claims, 1 Drawing Sheet

MULTI-PORT VALVE ASSEMBLY

FIELD OF THE INVENTION

This invention relates generally to manifold-type valve assemblies to control the passage of fluid through a group of ports and, particularly, to such a valve assembly having independently adjustable but conjointing movable valve means.

BACKGROUND OF THE INVENTION

There are various industrial or commercial applications where a multi-port valve assembly must be used to direct an incoming fluid into one or more of a plurality of outlet ports. For instance, conventional vapor cycle refrigerant systems employ a vapor compressor to compress the refrigerant vapor, a condenser where the vapor is cooled and liquified, an expansion valve where liquid pressure is reduced, and an evaporator where the refrigerant is vaporized. Refrigerant enters the expansion valve as a liquid and leaves as a low pressure mixture of liquid and vapor. Where multiple evaporators are used in parallel, the refrigerant quality may not be the same in each of the parallel paths. In other words, one evaporator may receive mostly liquid and another may receive mostly vapor. This results in the cooling capacity of the evaporators being unequal.

With such systems as described above, there is a need to provide equal cooling capacity in the plurality of parallel evaporators by insuring that each evaporator receives the same mass flow of fluid at the same quality. One problem in designing valves for such applications is that the flow areas of the plurality of outlet ports are quite small and therefore difficult to manufacture uniformly. In other words, the primary cause of non-uniform flow through the multiple ports concerns variances in manufacturing tolerances. There may be different downstream resistances or different downstream pressure drops. For instance, there may be differences in the length of tubes connected to the valve ports.

Therefore, the invention is directed to providing a multi-port valve assembly, such as a multi-port refrigerant proportioning valve, which has a common inlet and a separate metering valve element or member for each of a plurality of output ports or lines leading to a corresponding plurality of evaporators, for instance, with all of the valve elements being movable conjointly or simultaneously. Since metering occurs in the liquid state and all metering valve elements are calibrated to have the same effective area, each evaporator receives an equal share of the total flow and cooling capacity is balanced among the evaporators.

SUMMARY OF THE INVENTION

An object, therefore, of the invention is to provide a multi-port valve assembly for controlling the flow of fluid through a plurality of outlet ports, the valve assembly including a new and improved design for independently metering flow through each port while simultaneously opening and closing the ports conjointly.

In the exemplary embodiment of the invention, a valve housing defines inlet means and the plurality of outlet ports. A valve member corresponds to each outlet port for controlling fluid flow through the respective port. Means are provided for independently adjusting each valve member for separately adjusting fluid flow characteristics through the respective port. Means are provided on the housing for conjointly moving the valve members for controlling fluid flow through all the outlet ports simultaneously.

As disclosed herein, the adjusting means for the valve members include first, coarse adjustment means and second, fine adjustment means.

The coarse adjustment means are operatively associated between the valve moving means and each respective valve member for varying a set position of each valve member relative to the moving means. In essence, the set position of each valve member is defined by discrete calibration means between the valve member and the moving means.

The valve members are shown herein as needle valves movable in an axial direction toward and away from their respective outlet ports. Actually, the needle valves project into the outlet ports. The fine adjustment means are operatively associated between each needle valve and its respective port and include means for independently varying the effective port size of each outlet port for any given operative coarse set-position of the respective needle valve. Specifically, each port includes a liner, and means are provided for independently adjusting the axial position of each liner which, therefore, varies the effective port size of each outlet port.

The needle valves have a very shallow taper, such as an included angle on the order of 2°-3°, to provide very fine control of the port area with relatively large axial movement of the respective needle valve.

Other objects, features and advantages of the invention will be apparent from the following detailed description taken in connection with the accompanying drawings.

DESCRIPTION OF THE DRAWING

The features of this invention which are believed to be novel are set forth with particularity in the appended claims. The invention, together with its objects and the advantages thereof, may be best understood by reference to the following description taken in conjunction with the accompanying drawing, in which:

DETAILED DESCRIPTION OF THE PREFERRED EMBODIMENT

Figure 1:
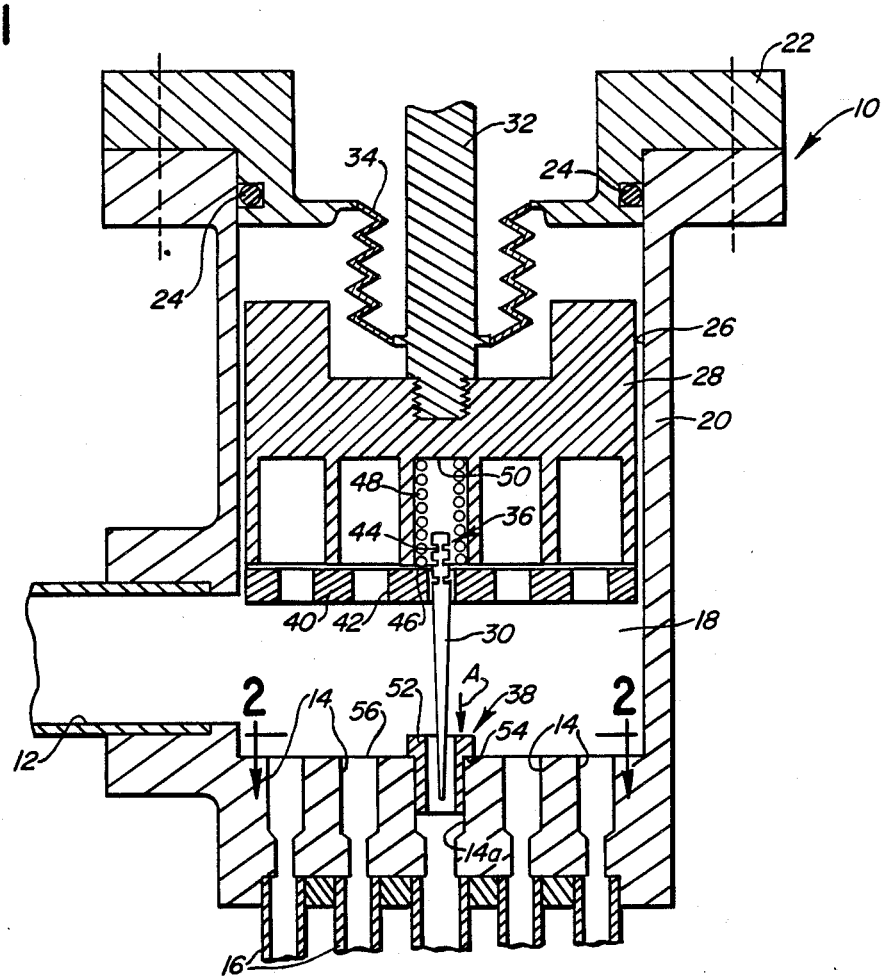
FIG. 1 is a somewhat schematic, axial section through the multi-port valve assembly of the invention.
Figure 2:
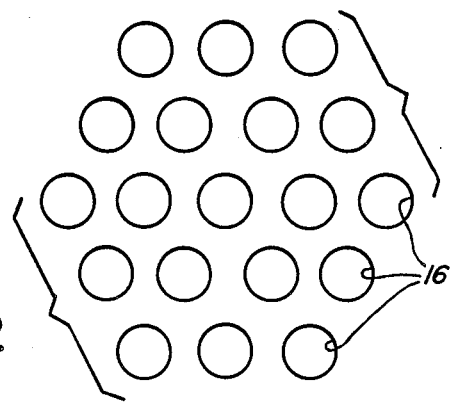
FIG. 2 is a plan view of the arrangement of the valve ports, as viewed along line 2—2 in FIG. 1.

Referring to the drawing in greater detail, a multi-port valve assembly is shown and generally designated 10, for controlling the flow of fluid from a common inlet 12 through a plurality of outlet ports 14 having tubes or lines 16 leading therefrom. For instance, the tubes may lead to a corresponding plurality of evaporators of a conventional vapor cycle refrigerant system. Of course, it should be understood that the multi-port valve assembly of this invention is not intended to be limited to such applications. Nevertheless, the invention provides equal cooling capacity to the plurality of parallel evaporators and insures that each evaporator receives the same mass flow of fluid at the same quality. In other words, refrigerant enters valve 10 as a liquid through inlet 12, into a chamber or plenun 18 and leaves through outlet ports 14 and tubes 16 as a low pressure mixture of liquid and vapor.

Valve assembly 10 includes a valve housing 20 which, in effect, defines inlet 12 and outlet ports 14. A cap 22 is positioned over housing 20, with seal means 24 therebetween. The cap is removable for facilitating adjustment of the valve assembly during the calibration process, as described hereinafter, so that the fluid inlet and outlet connections need not be disturbed when adjustment is required.

Housing 20 includes a cylindrical chamber 26 within which is mounted means, in the form of a plunger 28, for moving a plurality of needle valves 30. It should be understood that only one needle valve 30 is shown for outlet port 14a, with the understanding that a separate needle valve 30 and associated adjusting components (described hereinafter) will be incorporated in conjunction with each outlet port 14. A shaft 32 is secured to plunger 28 and extends exteriorly of housing 20 for operation by an appropriate linear stepper motor under appropriate control means (not shown). A welded hermetic bellows seal 34 is provided between cap 22 and shaft 32, as shown, to provide zero external leakage while permitting movement of the needle valve assembly to adjust system flow rate. Therefore, it can be seen that multi-port valve assembly 10 is designed such that all of the needle valves 30 (one for each port 14) are moved conjointly for controlling fluid flow through all the outlet ports simultaneously by movement of plunger 28, through shaft 32 and its appropriate controls.

The invention contemplates means for independently adjusting each valve member 30 for separately adjusting fluid flow characteristics through the respective port notwithstanding the conjoint movement of all the valve members simultaneously. The invention also contemplates that the adjusting means include first, coarse adjustment means, generally designated 36, and second, fine adjustment means, generally designated 38.

Specifically, coarse adjustment means 36 is operatively associated between each respective valve member 30 and the conjoint moving means defined by plunger 28. In essence, the coarse adjustment means provide for varying a set position of each valve member relative to the moving plunger. This is accomplished by providing an apertured plate 40 having apertures 42 through which the needle valves project. The apertured plate is appropriately fixed to plunger 28 after assembly. Each needle valve 30 is provided with a plurality of annular recesses 44 which comprise coarse adjustment steps. A snap-ring or clip 46 is positionable in any one of the recesses 44. A coil spring 48 is located within a bore 50 above the head of each needle valve 30. The coil spring bears against the base of bore 50 and against snap ring 46 to bias the snap ring against fixed aperture plate 40. Therefore, once adjusted, the respective needle valve is held in position relative to moving plunger 28. In essence, this structural assembly defines discrete calibration means between each respective needle valve and the moving plunger. The recesses 44 may be located to provide adjustment steps on the order of 5% of the area of the effective outlet port.

Fine adjustment means 38 is operatively associated between each needle valve 30 and its respective outlet port. It can be seen that the needle valves move in an axial direction toward and away from their respective ports, with the needle valves actually projecting into the ports. The fine adjustment means provide for independently varying the effective port size of each outlet port for any given operative coarse set-position of the respective needle valve.

Specifically, a liner 52 is threaded in each outlet port 14. Again, it should be emphasized that only one complete valve combination is shown in the drawings in order to avoid cluttering the illustration. A set of shims (one shim 54 being shown) are provided to define independent positions of adjustment of the axial position of liner 52. The shims are washer-shaped for surrounding liner 52 in position sandwiched between a lower face 56 of plenum 18 and the bottom of a headed upper portion of liner 52, as shown. Therefore, the number of shims or the size (thickness) of any individual shim will determine the axial position of liner 52. Since needle valve 30 is tapered in the direction of the outlet port, the axial position of liner 52 effectively determines the size of the port for the respective needle valve. For instance, if shims were used to position liner 52 as it is threaded in the direction of arrow "A", the effective port size would be increased for any set position of coarse adjustment for the needle valve. It can be seen that the needle shape of the valve members have a very shallow taper angle. Preferably, the taper of each needle valve is on the order of 2°–3° of the included angle of the sides of the needle configuration. This provides for very fine control of the port area with relatively large axial movement of the needle valve.

A distinct advantage of coarse adjustment means 36 is that snap ring 46 allows the respective needle valve 30 to "wiggle" or find a "home" in its respective outlet port. This allows the needle valve to self-align with the aperture and also allows movement for small particles to pass through the outlet port. Movement of a needle valve completely to one side of its outlet port, i.e. against one side of liner 52, effectively doubles the cross-dimension of the port on the opposite side of the needle valve, allowing passage therethrough of small particles that may be entrained in the flowing fluid.

In use, valve 10 would be initially assembled, using removable cap 22, shaft 32, plunger 28, plate 40 snap ring 46 and coil spring 48 for a given application. In most applications, the general axial positions of the needle valves would be known by mathematical calculations depending on the parameters and requirements of the vapor cycle refrigerant system. This initial adjustment would include setting coarse adjustment means 36 as described above, and preliminarily setting fine adjustment means 38 for all the valves. The valve assembly then would be subjected to a "flow check" to determine the flow characteristics through the individual outlet ports or in an actual system downstream of the ports which would include any manufacturing tolerances, downstream resistance, downstream pressure drop differentials, and the like. In production, this would be performed by flow meters with computer readouts, for instance. The preliminary testing, of course, would arrive at preliminary calibrations as to what effect one increment of coarse adjustment might have on the system and/or what effect a given shim 54 might have on the system. Once determined, continued production can take place wherein the problem of prior art valve assemblies is encountered. As stated above, manufacturing tolerances is a primary cause of variances in fluid flow through such valve assemblies. However, with the invention, non-uniform fluid flow characteristics would be detected and subsequent coarse and/or fine adjustment can be readily made without disturbing the fluid inlet and outlet connections of the valve assembly. In other words, notwithstanding the fact that all of the valve members are conjointly moved in unison to vary the flow rate to a plurality of parallel evaporators, for instance, adjustment of the individual valve members is afforded to insure that each evaporator ultimately receives the same mass flow of fluid and at the same quality.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A multi-port valve assembly for controlling the flow of fluid through a plurality of outlet ports, comprising:
    a valve housing defining inlet means and said plurality of outlet ports;
    a valve member corresponding to each outlet port for controlling fluid flow through the respective port;
    menas for independently adjusting each valve member for separately adjusting fluid flow characteristics through the respective port including first, coarse adjustment means and second fine adjustment means; and
    means on the housing for conjointly moving the valve members for controlling fluid flow through all the outlet ports simultaneously.

2. The multi-port valve assembly of claim 1 wherein said first, coarse adjustment means include means operatively associated between the moving means and each respective valve member.

3. The multi-port valve assembly of claim 2 wherein said second, fine adjustment means include means operatively associated between each valve member and its respective port.

4. The multi-port valve assembly of claim 2 wherein said first coarse adjustment means include means for varying a set position of each valve member relative to the moving means.

5. The multi-port valve assembly of claim 4 wherein said set position of each valve member is defined by discrete calibration means between the valve member and the moving means.

6. The multi-port valve assembly of claim 2 wherein said valve members comprise needle valves movable in an axial direction toward and away from their respective outlet ports.

7. The multi-port valve assembly of claim 6 wherein said first, coarse adjustment means include means defining discrete incremental axial positions of adjustment for each needle valve relative to the moving means.

8. The multi-port valve assembly of claim 1 wherein said second, fine adjustment means include means operatively associated between each valve member and its respective port.

9. The multi-port valve assembly of claim 8 wherein said valve members comprise needle valves movable in an axial direction toward and away from their respective outlet ports.

10. The multi-port valve assembly of claim 9 wherein said second, fine adjustment means include means for independently varying the effective port size of each outlet port for any given operative position of the respective needle valve.

11. The multi-port valve assembly of claim 10 wherein each port includes a liner, and including means for independently adjusting the axial position of each liner 12. The multi-port valve assembly of claim 11 wherein the included angle of taper for each needle valve is on the order of 2°–3°.

13. The multi-port valve assembly of claim 1 wherein said valve members comprise needle valves movable in an axial direction toward and away from their respective outlet ports, and said fine adjusting means include means for independently varying the effective port size of each outlet port.

14. The multi-port valve assembly of claim 13 wherein each port includes a liner, and including means for independently adjusting the axial position of each liner.

15. The multi-port valve assembly of claim 14 wherein the included angle of taper for each needle valve is on the order of 2°–3°.

16. The multi-port valve assembly of claim 1 wherein said valve members comprise needle valves movable in an axial direction toward and away from their respective outlet ports, and said coarse adjusting means include discrete calibration means between the needle valves and the moving means.

17. The multi-port valve assembly of claim 1 wherein said valve members comprise needle valves projecting into the outlet ports, the needle valves being loosely mounted on the moving means to allow transverse movement of the needle valves relative to the ports.

18. A multi-port valve assembly for controlling the flow of fluid through a plurality of outlet ports, comprising:
    a valve housing defining inlet means and said plurality of outlet ports;
    a valve member corresponding to each outlet port for controlling fluid flow through the respective port;
    first, coarse adjustment means for varying a set position of each valve member relative to the moving means, the set position being defined by discrete calibration means between the valve member and the moving means;
    second, fine adjustment means for independently varying the effective port size of each outlet port for any given operative set position of the respective valve member; and
    means on the housing for conjointly moving the valve members for controlling fluid flow through all the outlet ports simultaneously, said coarse adjustment means being operatively associated between the moving means and each respective valve member.

19. The multi-port valve assembly of claim 18 wherein said valve members comprise needle valves movable in an axial direction toward and away from their respective outlet ports.

20. The multi-port valve assembly of claim 19 wherein said first, coarse adjustment means include means defining discrete incremental axial positions of adjustment for each needle valve relative to the moving means.

21. The multi-port valve assembly of claim 19 wherein each port includes a liner, and including means for independently adjusting the axial position of each liner.

22. The multi-port valve assembly of claim 21 wherein the included angle of taper for each needle valve is on the order of 2°–3°.

23. A multi-port valve assembly for controlling the flow of fluid through a plurality of outlet ports, comprising:
- a valve housing defining inlet means and said plurality of outlet ports, each port including a liner;
- a needle valve movable in an axial direction toward and away from each respective outlet port for controlling fluid flow through that outlet port; and
- adjustment means for independently varying the effective port size of each outlet port for the respective needle valve including means for independently adjusting the axial position of each liner.

24. The multi-port valve assembly of claim 23 wherein the included angle of taper for each needle valve is on the order of 2°–3°.

* * * * *